United States Patent
Kato

(10) Patent No.: US 9,876,956 B2
(45) Date of Patent: Jan. 23, 2018

(54) IMAGING APPARATUS, IMAGING CONTROL METHOD AND STORAGE MEDIUM

(71) Applicant: CASIO COMPUTER CO., LTD., Shibuya-ku, Tokyo (JP)

(72) Inventor: Yoshiyuki Kato, Higashiyamato (JP)

(73) Assignee: CASIO COMPUTER CO., LTD., Tokyo (JP)

(*) Notice: Subject to any disclaimer, the term of this patent is extended or adjusted under 35 U.S.C. 154(b) by 558 days.

(21) Appl. No.: 14/596,887

(22) Filed: Jan. 14, 2015

(65) Prior Publication Data
US 2015/0207992 A1 Jul. 23, 2015

(30) Foreign Application Priority Data
Jan. 23, 2014 (JP) ................ 2014-010126

(51) Int. Cl.
*H04N 5/232* (2006.01)
*H04N 1/21* (2006.01)
*H04N 5/77* (2006.01)
*H04N 5/907* (2006.01)
*H04N 9/804* (2006.01)

(52) U.S. Cl.
CPC ....... *H04N 5/23245* (2013.01); *H04N 1/2133* (2013.01); *H04N 1/2137* (2013.01); *H04N 5/772* (2013.01); *H04N 5/907* (2013.01); *H04N 9/8042* (2013.01)

(58) Field of Classification Search
None
See application file for complete search history.

(56) References Cited

U.S. PATENT DOCUMENTS 5,495,342 A * 2/1996 Harigaya ............... G11B 15/02
348/207.99
7,012,636 B2  3/2006 Hatanaka
(Continued)

FOREIGN PATENT DOCUMENTS

JP 2002094875 A 3/2002
JP 2003101910 A 4/2003
(Continued)

OTHER PUBLICATIONS

Japanese Office Action (and English translation thereof) dated Nov. 11, 2015, issued in counterpart Japanese Application No. 2014-010126.

*Primary Examiner* — WB Perkey
(74) *Attorney, Agent, or Firm* — Holtz, Holtz & Volek PC

(57) ABSTRACT

In the present invention, when a user operation (shutter button depression) for instructing to start still image recording or a user operation (REC button depression) for instructing to start moving image recording is performed and detected at recording timing in interval shooting, a CPU records a still image or a moving image by an imaging section based on the user operation, without temporarily stopping the recording for the interval shooting. In addition, the CPU stores, in an external memory, a still image or a moving image recorded by the interval shooting and the still image or the moving image recorded by the detection of the user's instruction operation such that they can be managed to be usable as material for the interval shooting.

12 Claims, 7 Drawing Sheets

(56) References Cited

U.S. PATENT DOCUMENTS

| | | | |
|---|---|---|---|
| 2002/0033886 A1 | 3/2002 | Hatanaka | |
| 2004/0189823 A1* | 9/2004 | Shibutani | H04N 1/2112 348/231.1 |
| 2004/0189824 A1* | 9/2004 | Shibutani | H04N 1/00453 348/231.2 |
| 2005/0212943 A1 | 9/2005 | Karasaki et al. | |
| 2011/0102616 A1* | 5/2011 | Migiyama | G11B 27/3027 348/222.1 |
| 2013/0002896 A1* | 1/2013 | Fukushima | H04N 5/23245 348/220.1 |
| 2013/0209056 A1* | 8/2013 | Kim | H04N 5/772 386/225 |
| 2014/0286627 A1* | 9/2014 | Kato | H04N 5/772 386/278 |
| 2015/0178318 A1* | 6/2015 | Lee | H04N 1/2116 348/231.3 |
| 2015/0181121 A1* | 6/2015 | Tohyama | H04N 5/232 348/222.1 |
| 2015/0207992 A1* | 7/2015 | Kato | H04N 5/23245 348/220.1 |
| 2015/0207993 A1* | 7/2015 | Kato | H04N 5/23245 348/221.1 |
| 2016/0065829 A1* | 3/2016 | Kiso | H04N 5/23206 348/211.3 |

FOREIGN PATENT DOCUMENTS

| | | |
|---|---|---|
| JP | 2004186866 A | 7/2004 |
| JP | 2005286551 A | 10/2005 |

* cited by examiner

IMAGING APPARATUS, IMAGING CONTROL METHOD AND STORAGE MEDIUM

CROSS-REFERENCE TO RELATED APPLICATION

This application is based upon and claims the benefit of priority from the prior Japanese Patent Application No. 2014-010126, filed Jan. 23, 2014, the entire contents of which are incorporated herein by reference.

BACKGROUND OF THE INVENTION

1. Field of the Invention

The present invention relates to an imaging apparatus, an imaging control method and a storage medium.

2. Description of the Related Art

As described in Japanese Patent Application Laid-Open (Kokai) Publication No. 2005-286551, an imaging apparatus having an interval shooting function is conventionally known.

This interval shooting function, which is commonly used for the purpose of prolonged observation or monitoring, is generally configured to continue until "some conditions" are satisfied.

The "some conditions" herein include a condition that the image memory is full and further imaging operations cannot be performed and a condition that the interval shooting function has been canceled by an external operation.

SUMMARY OF THE INVENTION

In accordance with one aspect of the present invention, there is provided an imaging apparatus comprising: an imaging section; a first acquiring section which repeatedly acquires an image by driving the imaging section at preset timing; a second acquiring section which acquires an image by driving the imaging section by receiving an instruction at arbitrary timing, while maintaining acquisition processing by the first acquiring section; a storing section which stores the image acquired by the first acquiring section and the image acquired by the second acquiring section; a judging section which judges whether the arbitrary timing and the preset timing coincide with each other; and a controlling section which controls at least one of imaging by the imaging section and storing of the image in the storing section, based on a judgment result by the judging section.

In accordance with another aspect of the present invention, there is provided an image controlling method for an imaging apparatus including an imaging section, comprising: a first acquiring step of repeatedly acquiring an image by driving the imaging section at preset timing; a second acquiring step of acquiring an image by driving the imaging section by receiving an instruction at arbitrary timing, while maintaining acquisition processing in the first acquiring step; a storing step of storing the image acquired in the first acquiring step and the image acquired in the second acquiring step; a judging step of judging whether the arbitrary timing and the preset timing coincide with each other; and a controlling step of controlling at least one of imaging by the imaging section and storing of the image, based on a judgment result in the judging step.

In accordance with another aspect of the present invention, there is provided a non-transitory computer-readable storage medium having stored thereon a program that is executable by a computer in an imaging apparatus including an imaging section, the program being executable by the computer to perform functions comprising: first acquisition processing for repeatedly acquiring an image by driving the imaging section at preset timing; second acquisition processing for acquiring an image by driving the imaging section by receiving an instruction at arbitrary timing, while maintaining the first acquisition processing; storing processing for storing the image acquired in the first acquisition processing and the image acquired in the second acquisition processing; judgment processing for judging whether the arbitrary timing and the preset timing coincide with each other; and control processing for controlling at least one of imaging by the imaging section and the storing processing, based on a judgment result in the judgment processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of the present invention will hereinafter be described with reference to the drawings.

A. Structure of Embodiment

Figure 1:
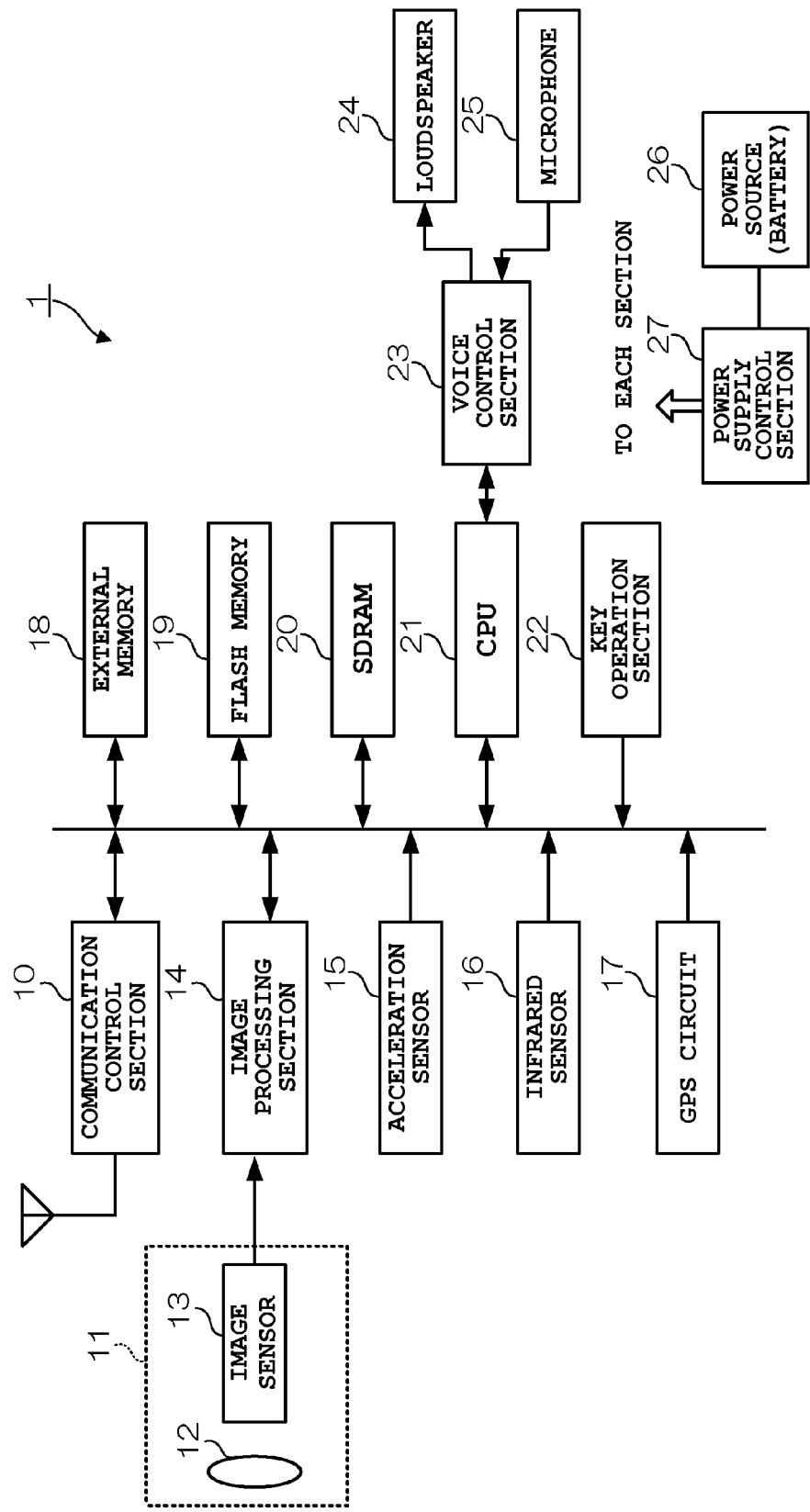
FIG. 1 is a block diagram showing the structure of an imaging apparatus 1 according to an embodiment of the present invention.

FIG. 1 is a block diagram showing the structure of an imaging apparatus 1 according to an embodiment of the present invention. In FIG. 1, a head-mounted imaging apparatus 1 includes a communication control section 10, an imaging section 11, an image processing section 14, an acceleration sensor 15, an infrared sensor 16, a GPS (Global Positioning System) circuit 17, an external memory 18, a flash memory 19, a SDRAM (Synchronous Dynamic Random Access Memory) 20, a CPU (Central Processing Unit) 21, a key operation section 22, a voice control section 23, a loudspeaker 24, a microphone 25, a power source (battery) 26, and a power supply control section 27.

The communication control section 10 transfers captured image data (still images or moving images) to a server on the Internet, or to an information processing device such as a personal computer via the Internet, etc.

This communication control section 10 can also transfer a live view image or images being recorded to an external replay/display apparatus via peer-to-peer communications.

The imaging section 11 includes a lens block 12 constituted by an optical lens group and an image sensor 13 such as a CCD (Charge Coupled Device) or CMOS (Complementary Metal-Oxide Semiconductor).

The image sensor 13 converts an image entering from the lens block 12 to a digital signal.

The image processing section 14 performs image processing (such as pixel interpolation processing, correction, luminance color-difference signal generation, white balance processing, and exposure correction processing) and compression and expansion of image data (for example, compression and expansion of a JPEG (Joint Photographic Experts Group) format, Motion-JPEG format, or MPEG (Moving Picture Experts Group) format).

The acceleration sensor 15 detects the movement of the imaging apparatus 1 which is made in conjunction with the movement of a user's head.

The CPU 21 judges whether the imaging apparatus 1 has been fixed (with a tripod) or handheld and determines the degree of camera shake from a detection result of the acceleration sensor 15.

The infrared sensor 16 detects the movement of a photographic subject.

The CPU 21 detects the movement of a photographic subject from images captured by the image sensor 13 or a detection result of the infrared sensor 16.

The GPS circuit 17 acquires the positional information of the head-mounted imaging apparatus 1.

In this embodiment, positional information acquired by the GPS circuit 17 is used to, for example, determine imaging timing for interval shooting.

The external memory 18 is a removable storage medium, and stores image data captured by the imaging section 11 and the like.

The flash memory 19 is a storage medium for storing image data captured by the imaging section 11 and the like.

The SDRAM 20 is used as a buffer memory for temporarily storing image data captured by the imaging section 11 and sent to the CPU 21, and is also used as a working memory for the CPU 21.

The CPU 21 is a one-chip microcomputer for controlling each section of the head-mounted imaging apparatus 1.

In interval shooting, the CPU 21 switches between still image photographing and moving image capturing by interval triggers at predetermined timing, according to the occurrence conditions of motion blur and camera shake.

In particular, in the present embodiment, when a user operation (shutter button depression) for instructing to start still image recording or a user operation (REC button depression) for instructing to start moving image recording is performed and detected while interval shooting is being performed, the CPU 21 starts still image photographing or moving image capturing in accordance with the user operation, without temporarily stopping the interval shooting.

If the detection timing at which a user operation (shutter button depression) for instructing to start still image recording or a user operation (REC button depression) for instructing to start moving image recording is detected coincides with interval shooting timing, a still image or a moving image recorded in response to the user's instruction operation is stored in a normal imaging manner, and also stored to be usable as material for the interval shooting.

Specifically, in the normal imaging, images are stored in a normal folder in the external memory 18. In the case where images are used as material for interval shooting, they are stored in a folder for interval shooting in the external memory 18.

Also, when selectively switching between still image photographing and moving image capturing according to the occurrence conditions of motion blur and camera shake, the CPU 21 judges whether the imaging apparatus 1 has been fixed with a tripod or the like or been handheld by the user, or in other words, in a state which has not been fixed with a tripod or the like, from a detection result of the acceleration sensor 15.

In addition, the CPU 21 judges the degree of camera shake from a detection result of the acceleration sensor 15.

Moreover, the CPU 21 judges whether the photographic subject is moving or standing still from a comparison result between the frames of images captured by the image sensor 13 or a detection result of the infrared sensor 16.

Then, the CPU 21 selects a moving image (such as a short video of five seconds) or a still image (high sensitivity/high-speed shutter) as contents to be imaged and recorded in the interval shooting, based on whether or not the imaging apparatus 1 has been fixed with a tripod or the like, the degree of the camera shake of the imaging apparatus 1, and whether the photographic subject is moving or standing still, and then controls to perform processing therefor.

In still image photographing and recording, the CPU 21 photographs and records a less blurred image by changing imaging conditions (high sensitivity/high-speed shutter).

The key operating section 22 inputs an operation mode or an operation instruction for starting, pausing, or stopping image capturing in response to a touch operation from a user.

The audio control section 23 converts audio (such as alarm sound) at the time of the playback of captured moving images to an analog signal and outputs it from the loudspeaker 24, under the control of the CPU 21. Also, the audio control section 23 digitalizes and captures environmental sound collected by the microphone 25 in moving image capturing. The power supply (battery) 26 is a rechargeable secondary battery.

The power supply control section 27 stabilizes the output voltage of the power supply (battery) 26, and supplies driving electric power to each section.

B. Operation of Embodiment

Next, the operation of the present embodiment is described.

Figure 2:
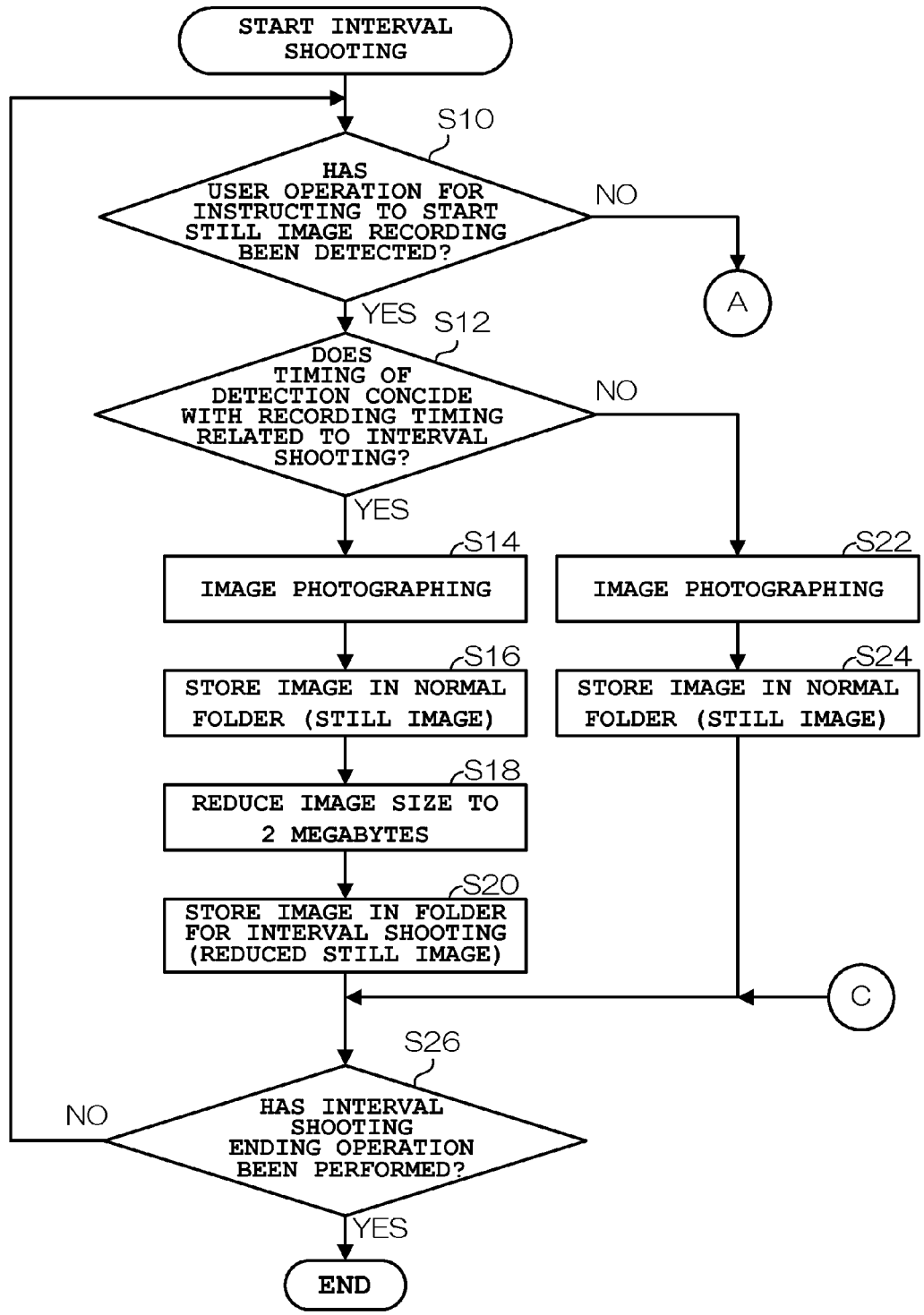
FIG. 2 is a flowchart for describing operations in interval shooting by the imaging apparatus 1 of the embodiment.
Figure 3:
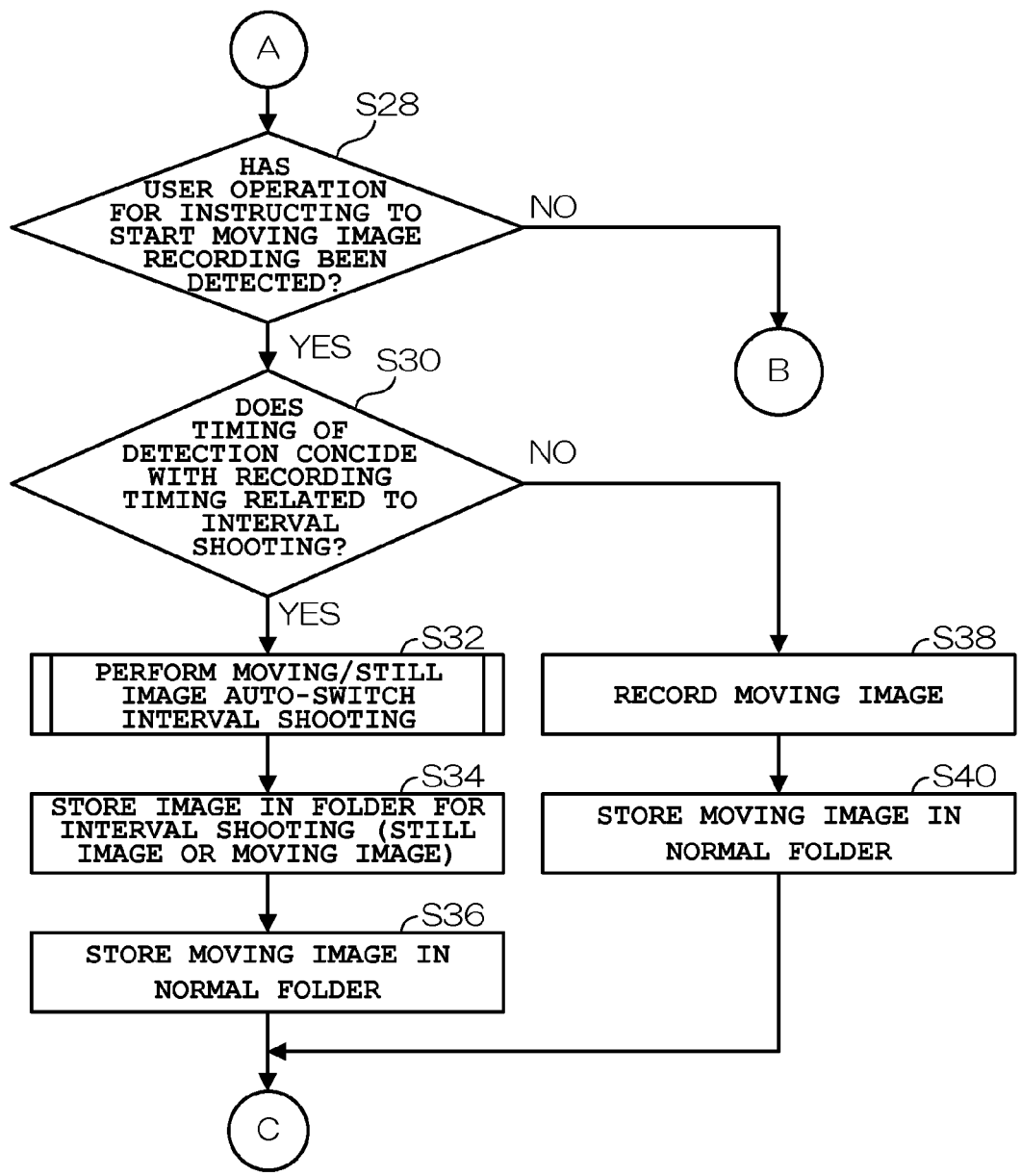
FIG. 3 is also a flowchart for describing operations in interval shooting by the imaging apparatus 1 of the embodiment.
Figure 4:
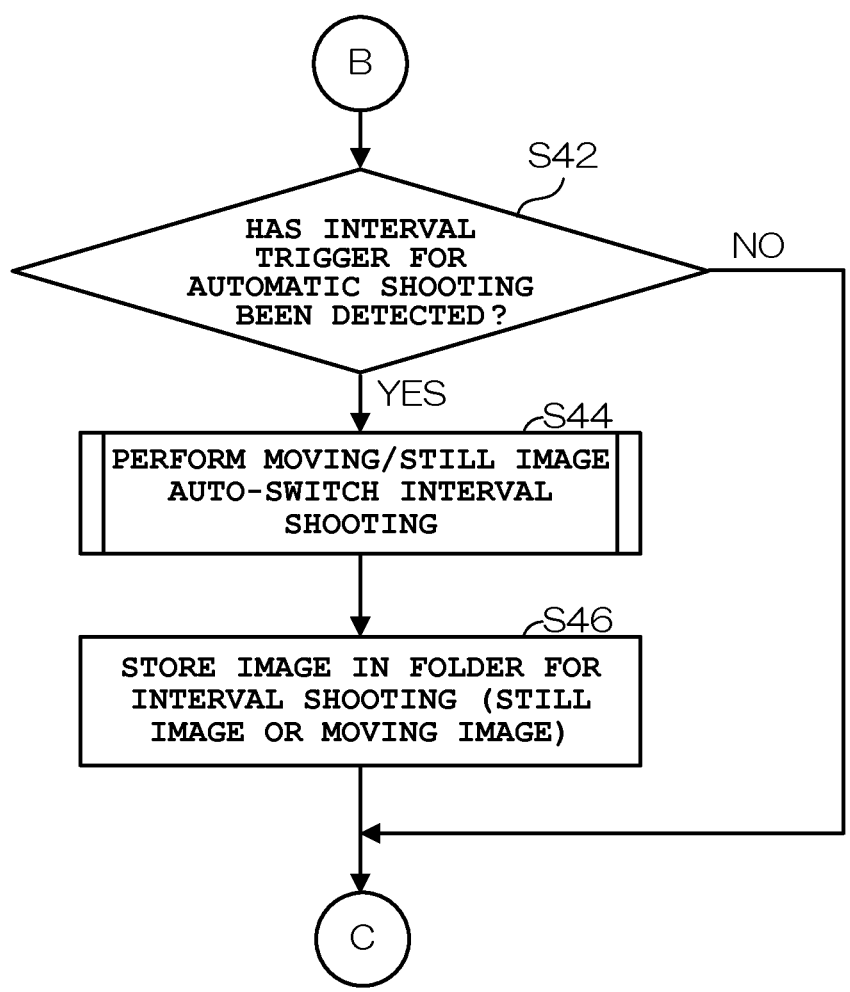
FIG. 4 is also a flowchart for describing operations in interval shooting by the imaging apparatus 1 of the embodiment.

FIG. 2 to FIG. 4 are flowcharts for describing operations in interval shooting by the imaging apparatus 1 of the present embodiment.

When an interval shooting mode is set in the imaging apparatus 1, the timing of interval shooting comes by the trigger of interval shooting occurring at predetermined timing.

As this trigger, time intervals (for example, every five minutes) or distance intervals (for example, every one kilometer) acquired from GPS information may be used.

In addition, various triggers for automatic shooting may be used, such as a trigger that occurs when the imaging apparatus 1 is judged to be positioned in a specified area by use of GPS information, or a trigger that occurs when a signal is received from a communication device in an external device.

In the interval shooting mode, the CPU 21 first judges whether a user operation (shutter button depression) for instructing to start still image recording has been detected (Step S10).

Subsequently, when judged that a user operation (shutter button depression) for instructing to start still image recording has been detected in the interval shooting mode (YES at Step S10), the CPU 21 judges whether this operation has been detected during recording related to interval shooting, or in other words, judges whether the timing of the detection of the user operation (shutter button depression) for instructing to start still image recording coincides with recording timing related to interval shooting (Step S12).

Then, when judged that the timing of the detection of the instruction operation (shutter button depression) coincides with recording timing related to interval shooting (YES at Step S12), the CPU 21 controls the imaging section 11 to perform normal still image photographing under currently set imaging conditions (Step S14).

Next, the CPU 21 stores a photographed still image in the normal folder in the external memory 18 (Step S16).

Then, the CPU 21 reduces the size of the photographed still image to a size set for interval shooting, such as a size of about 2 megabytes (Step S18), and stores the reduced still image in the folder for interval shooting in the external memory 18 (Step S20).

That is, in the interval shooting mode, when it is judged that a user operation (shutter button depression) for instructing to start still image recording coincides with recording timing related to interval shooting, imaging processing is set such that normal still image photographing is performed.

Then, after the photographing, a photographed still image is stored in the normal folder, and an image acquired by the photographed still image being reduced to a size of about 2 megabytes set for interval shooting is stored in the folder for interval shooting in the external memory 18 as material for interval shooting.

At Step S12, when judged that the timing of the detection of the instruction operation (shutter button depression) does not coincide with recording timing related to interval shooting (NO at Step S12), the CPU 21 controls the imaging section 11 to perform still image photographing under current imaging conditions set for normal still image recording (Step S22), and stores a photographed still image in the normal folder in the external memory 18 (Step S24).

That is, when a user operation (shutter button depression) for instructing to start still image recording is performed at timing other than recording timing related to interval shooting, a photographed still image is stored in the normal folder in the external memory 18 in a normal imaging manner.

After Steps S20 and S24, the CPU 21 judges whether a user operation for ending the interval shooting has been performed (Step S26).

Then, when judged that an operation for ending the interval shooting has not been performed (NO at Step S26), the CPU 21 returns to Step S10.

At Step S10, when judged that a user operation (shutter button depression) for instructing to start still image recording has not been detected in the interval shooting mode (NO at Step S10), the CPU 21 judges whether a user operation (REC button depression) for instructing to start moving image recording has been detected (Step S28).

Then, when judged that a user operation (REC button depression) for instructing to start moving image recording has been detected in the interval shooting mode (YES at Step S28), the CPU 21 judges whether recording related to interval shooting is being performed, or in other words, judges whether the timing of the detection of the user operation (REC button depression) for instructing to start moving image recording coincides with recording timing related to interval shooting (Step S30).

Then, when judged that the timing of the detection of the user operation (REC button depression) for instructing to start moving image recording coincides with recording timing related to interval shooting (YES at Step S30), the CPU 21 performs moving/still image auto-switch interval shooting (Step S32).

This moving/still image auto-switch interval shooting is processing where a still image or a moving image having a predetermined time length is selectively captured according to the occurrence conditions of motion blur and camera shake.

Then, the CPU 21 stores a captured still image or moving image in the folder for interval shooting in the external memory 18 (Step S34). In addition, the CPU 21 stores the recorded still image or moving image in the normal folder in the external memory 18 (Step S36).

That is, in the interval shooting mode, when it is judged that the timing of the detection of a user operation (REC button depression) for instructing to start moving image recording coincides with recording timing related to interval shooting, a recorded still image or moving image is stored in the folder for interval shooting in the external memory 18 as material for interval shooting, and also stored in the normal folder in the external memory 18 as in the case of a normal moving image.

At Step S30, when judged that the timing of the detection of the user operation (REC button depression) for instructing to start moving image recording does not coincide with recording timing related to interval shooting (NO at Step S30), the CPU 21 controls the imaging section 11 to perform moving image capturing under currently set imaging conditions (Step S38), and stores a captured moving image in the normal folder in the external memory 18 (Step S40).

That is, when a user operation (REC button depression) for instructing to start moving image recording is performed at timing other than recording timing related to interval shooting, a captured moving image is stored in the normal folder in the external memory 18 in a normal imaging manner.

After Steps S36 and S40, the CPU 21 judges whether a user operation for ending the interval shooting has been performed (Step S26 in FIG. 2). Then, when judged that an operation for ending the interval shooting has not been performed (NO at Step S26), the CPU 21 returns to Step S10.

At Step S28, when judged that a user operation (REC button depression) for instructing to start moving image recording has not been detected in the interval shooting mode (NO at Step S28), the CPU 21 judges whether an interval trigger for automatic shooting has been detected (Step S42).

Then, when judged that an interval trigger for automatic shooting has been detected (YES at Step S42), the CPU 21 performs moving/still image auto-switch interval shooting (Step S44).

Next, the CPU 21 stores a captured still image or short movie in the folder for interval shooting in the external memory 18 (Step S46).

That is, in the interval shooting mode, when an interval trigger is detected, or in other words, when the timing of interval shooting comes, a captured still image or short movie is stored in the folder for interval shooting in the external memory 18 as material for interval shooting.

Then, the CPU 21 judges whether a user operation for ending the interval shooting has been performed (Step S26 in FIG. 2).

When judged that an operation for ending the interval shooting has not been performed (NO at Step S26), the CPU 21 returns to Step S10.

Figure 5:
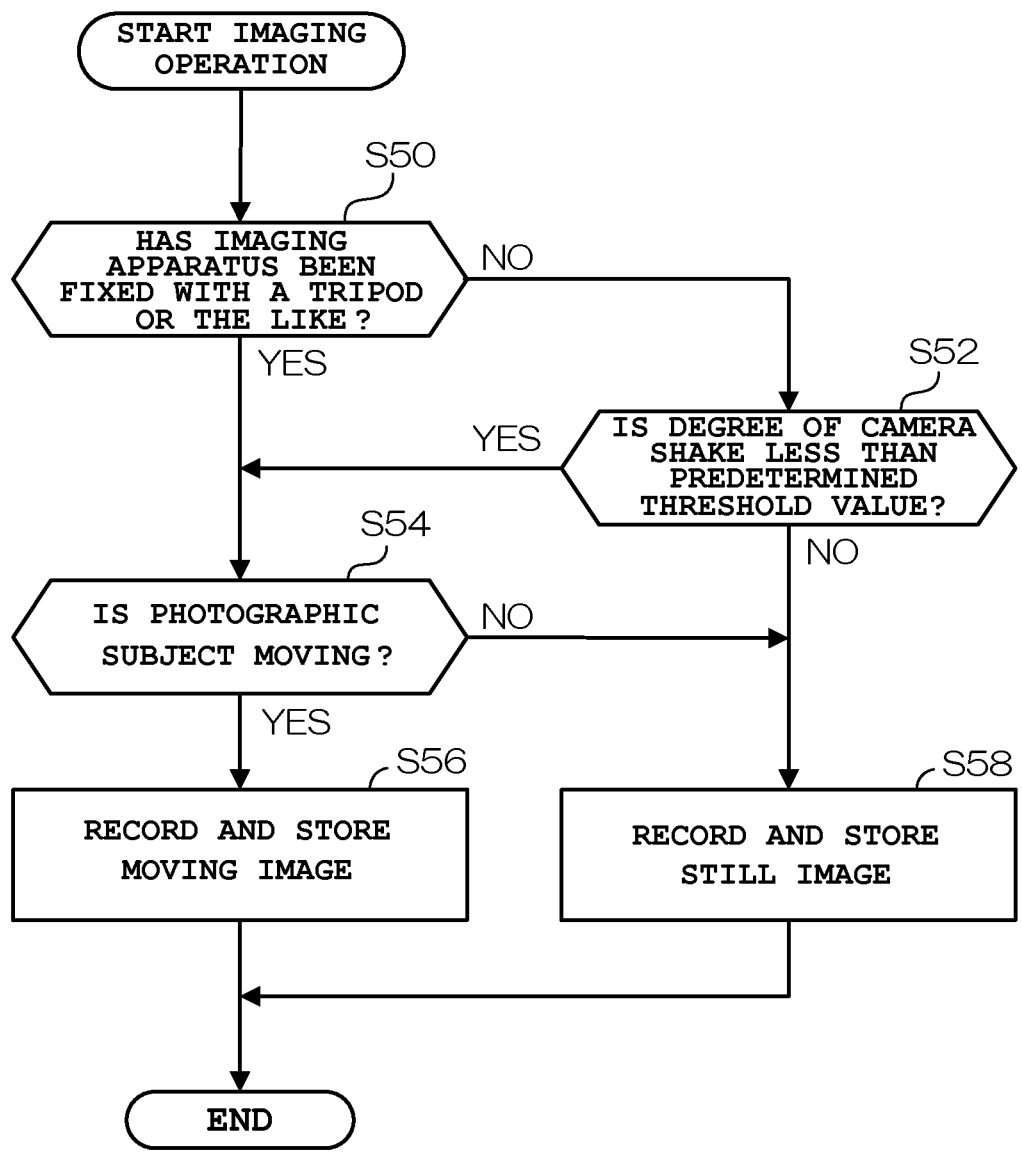
FIG. 5 is a flowchart for describing operations in moving/still image auto-switch interval shooting.

FIG. 5 is a flowchart for describing operations in the moving/still image auto-switch interval shooting of the present embodiment.

First, the CPU 21 judges whether the imaging apparatus 1 has been fixed with a tripod or the like or been handheld by the user, or in other words, judges whether or not the imaging apparatus 1 has been fixed with a tripod or the like, based on information from the acceleration sensor 15 (Step S50).

When judged that the imaging apparatus 1 has been fixed with a tripod or the like (YES at Step S50), the CPU 21 judges whether a photographic subject (target to be imaged) is moving from images captured by the image sensor 13 or a detection result of the infrared sensor 16 (Step S54).

Specifically, when the value of the movement of the photographic subject is equal to or larger than a predetermined threshold value (second threshold value), the CPU 21 judges that the photographic subject is moving. Conversely, when the value of the movement of the photographic subject is less than the predetermined threshold value (second threshold value), the CPU 21 judges that the photographic subject is not moving, or in other words, standing still.

At Step S54, when judged that the photographic subject is moving (YES at Step S54), the CPU 21 controls the imaging section 11 to perform image capturing for five seconds, and stores image contents acquired by this five-second image capturing as a moving image (Step S56).

By image capturing and recording being performed in this way, a moving image corresponding to the movement of the photographic subject can be captured with less camera shake and recorded.

Then, the CPU 21 returns to the main routine.

At Step S50 and Step S54, when judged that the imaging apparatus 1 has been fixed with a tripod or the like (YES at Step S50) and the photographic subject is not moving (NO at Step S54), the CPU 21 sets, as an imaging condition, a sensitivity higher than a normal sensitivity or a shutter speed faster than a normal shutter speed, and stores an image captured with this setting by the imaging section 11 as a still image (Step S58).

By image capturing and recording being performed in this way, an unblurred still image can be stored.

Then, the CPU 21 returns to the main routine.

At Step S50, when judged that the imaging apparatus 1 has been handheld by the user, or in other words, the imaging apparatus 1 has not been fixed with a tripod or the like (NO at Step S50), the CPU 21 judges whether the degree of camera shake being applied to the imaging apparatus 1 is less than a predetermined threshold value (first threshold value) from a detection result of the acceleration sensor 15 (Step S52).

Then, when judged that the degree of the camera shake being applied to the imaging apparatus 1 is less than the predetermined threshold value (first threshold value) (YES at Step S52), the CPU 21 judges whether the photographic subject is moving from images captured by the image sensor 13 or a detection result of the infrared sensor 16 (Step S54).

When judged that the photographic subject is moving (YES at Step S54), the CPU 21 controls the imaging section 11 to perform image capturing for five seconds, and stores image contents acquired by this five-second image capturing as a moving image (Step S56).

That is, a moving image corresponding to the movement of the photographic subject is captured with less camera shake and recorded. Then, the CPU 21 returns to the main routine.

At Step S52 and Step S54, when judged that the degree of the camera shake being applied to the imaging apparatus 1 is less than the predetermined threshold value (first threshold value) (YES at Step S52) and the photographic subject is standing still (NO at Step S54), the CPU 21 sets, as an imaging condition, a sensitivity higher than a normal sensitivity or a shutter speed faster than a normal shutter speed, and stores an image captured with this setting by the imaging section 11 as a still image (Step S18).

That is, an unblurred still image is stored. Then, the CPU 21 returns to the main routine.

At Step S50 and Step S52, when judged that the imaging apparatus 1 has been handheld by the user, or in other words, the imaging apparatus 1 has not been fixed with a tripod or the like (NO at Step S50) and the degree of the camera shake being applied to the imaging apparatus 1 is equal to or larger than the predetermined threshold value (first threshold value) (NO at Step S52), the CPU 21 sets, as an imaging condition, a sensitivity higher than a normal sensitivity or a shutter speed faster than a normal shutter speed, and stores an image captured with this setting by the imaging section 11 as a still image (Step S58).

That is, an unblurred still image is stored. Then, the CPU 21 returns to the main routine.

Note that, when the imaging apparatus 1 has been fixed with a tripod or the like, camera shake does not easily occur, and therefore either moving image capturing or still image photographing is performed based on the movement of the photographic subject.

Here, when the photographic subject is moving, since camera shake does not occur and a varied scene can be captured, moving image capturing is performed.

On the other hand, when the photographic subject is not moving, still image photographing is performed because an unvaried scene is captured even if moving image capturing is performed.

Also, when the imaging apparatus 1 has been handheld by the user, either moving image capturing or still image photographing is performed with reference to a predetermined acceptable range for the camera shake of the imaging apparatus 1.

When the degree of the camera shake is out of the predetermined acceptable range, still image photographing is performed.

Here, high-speed shutter imaging is performed with a high sensitivity. That is, still image photographing that avoids image blurring as much as possible is performed.

By this operation, moving images that cause visually induced motion sickness due to substantial motion blur or panning of the imaging apparatus 1 can be avoided.

When the degree of the camera shake is within the predetermined acceptable range, since the degree of the camera shake of the imaging apparatus 1 is low, moving image capturing is performed.

Figure 6:
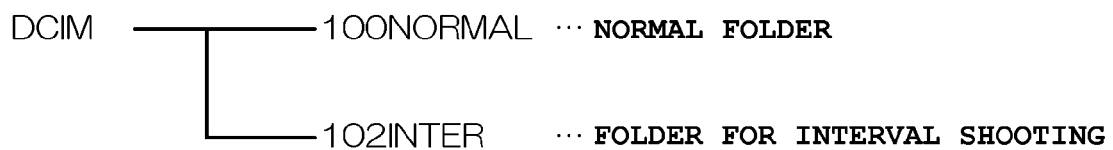
FIG. 6 is a conceptual diagram showing an example of the folder structure of an external memory 18 for the imaging apparatus 1 of the embodiment.

FIG. 6 is a conceptual diagram showing an example of the folder structure of the external memory 18 for the imaging apparatus 1 of the present embodiment.

The external memory 18 is first formatted when it is used, and then a folder structure such as that shown in FIG. 6 is created.

That is, in the external memory 18, a directory named "DCIM" is created as a root directory for storing photographed still images and captured moving images, and directories named "100NORMAL" and "102INTER" respectively are created as subdirectories.

In the example of the diagram, the directory "100NORMAL" is used as a normal directory, and the directory "102INTER" is used as a directory for interval shooting.

Figure 7:
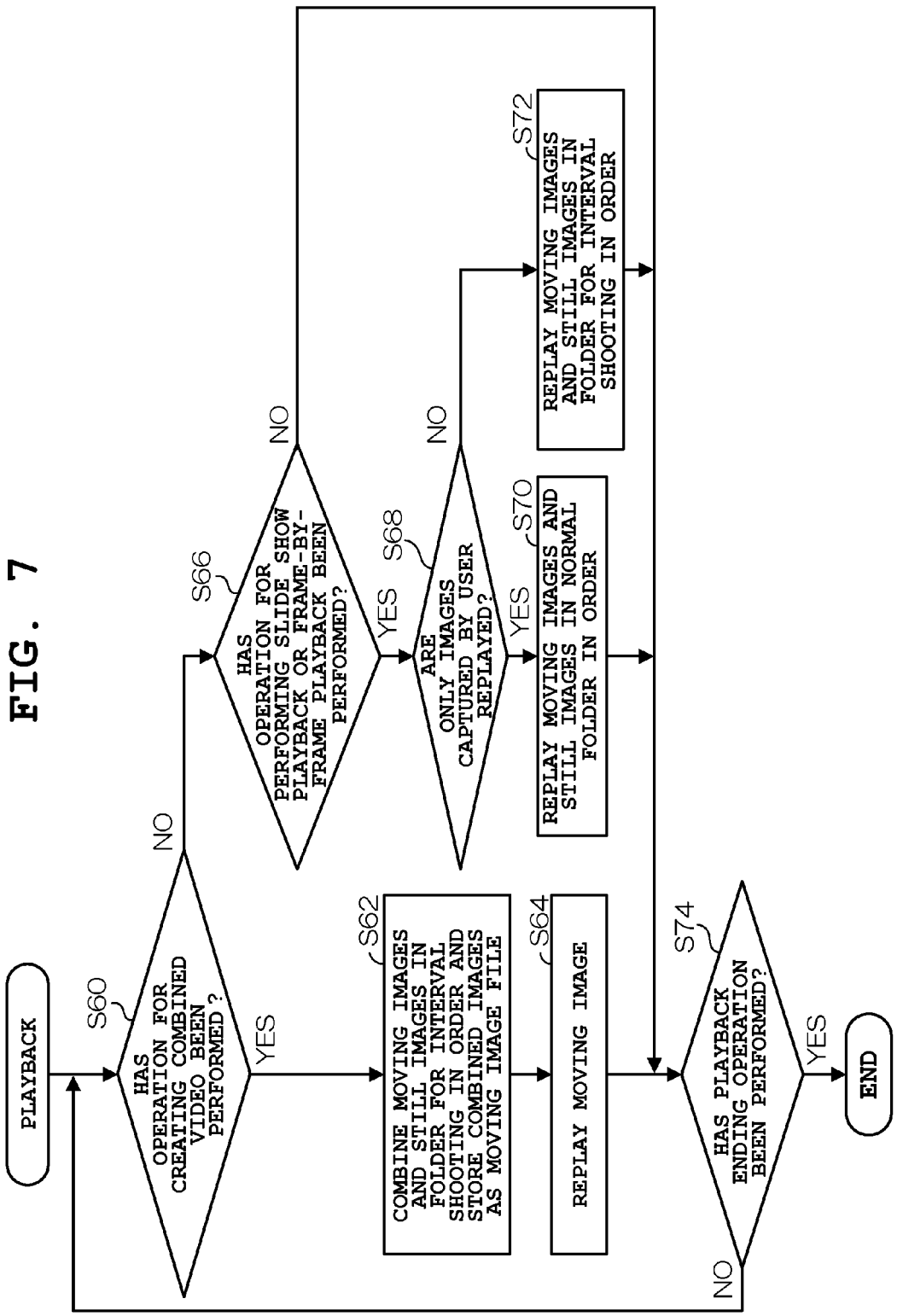
FIG. 7 is a flowchart for describing a playback operation by the imaging apparatus 1 of the embodiment.

FIG. 7 is a flowchart for describing a playback operation by the imaging apparatus 1 of the present embodiment.

At the time of playback, the CPU 21 judges whether the user has performed an operation for creating a video by combining still images and moving images (Step S60).

Then, when judged that the user has performed an operation for creating a video by combining still images and moving images (YES at Step S60), the CPU 21 combines short moving images and still images in the folder for interval shooting in the external memory 18, stores them as a moving image file (Step S62), and replays this moving image file (Step S64).

Conversely, when judged that the user has not performed an operation for creating a video by combining still images and moving images (NO at Step S60), the CPU 21 judges whether the user has performed an operation for performing slide show playback or frame-by-frame playback (Step S66).

When judged that the user has performed an operation for performing slide show playback or frame-by-frame playback (YES at Step S66), the CPU 21 judges whether this operation is an instruction to replay only images captured by the user (Step S68).

Then, when judged that this operation is an instruction to replay only images captured by the user (YES at Step S68), the CPU 21 replays moving images and still images in the normal folder in the external memory 18 in order (Step S70).

Conversely, when judged that this operation is not an instruction to replay only images captured by the user (NO at Step S68), the CPU 21 replays moving images and still images in the folder for interval shooting in the external memory 18 in order (Step S72).

Then, when any of the above-described Steps S64, S70 or S72 is completed, or when judged at Step S66 that the user has not performed an operation for performing slide show playback or frame-by-frame playback, the CPU 21 judges whether the user has performed an operation for ending the playback (Step S74).

When judged that the user has not performed an operation for ending the playback (NO at Step S74), the CPU 21 returns to Step S60, and repeats the above-described processing.

Conversely, when judged that the user has performed an operation for ending the playback (YES at Step S74), the CPU 21 ends the processing.

Note that, when being replayed, the moving images and still images are displayed on a display section (not shown) included in the imaging apparatus 1, an external display section connected thereto by a cable or the like, or an external device having a display section (such as a dedicated display device, a smartphone, or a tablet terminal) wirelessly connected to the communication control section 10.

In the present embodiment, still images and moving images recorded in the normal shooting mode and still images and moving images recorded in the interval shooting mode are stored and managed in different directories. However, the present invention is not limited thereto, and a configuration may be adopted in which identification information indicating the type of shooting mode used in imaging and recording is added to the header information of each recorded still image and moving image so that each image is associated with the shooting mode used to record it, and the still images and the moving images recorded in the respective shooting modes are stored in the same folder without being sorted into different folders.

By this configuration, an unnecessary increase of subfolders can be prevented.

In the above-described present embodiment, even if a user operation (shutter button depression) for instructing to start still image recording or a user operation (REC button depression) for instructing to start moving image recording is detected at recording timing in the interval shooting mode, a still image or a moving image based on the user's instruction operation is recorded by the imaging section 11 without the recording for the interval shooting being temporarily stopped. Then, the still image or the moving image recorded based on the user's instruction and a still image or a moving image recorded by the interval shooting are stored by being sorted into different folders, and managed. As a result of this configuration, a periodic imaging function can be continued without impairing user-friendliness.

Also, in the above-described present embodiment, even when recording timing related to interval shooting and the timing of a user operation for instructing to start recording do not coincide with each other, a still image or a moving image recorded by the interval shooting and a still image or a moving image recorded by the user's instruction operation are stored by being sorted into different folders, and managed. As a result of this configuration, a periodic imaging function can be continued without impairing user-friendliness.

Moreover, in the above-described present embodiment, when a user operation (shutter button depression) for instructing to start still image recording or a user operation (REC button depression) for instructing to start moving image recording is detected at recording timing in the interval shooting mode, a still image or a moving image captured by the user operation is stored and managed as a still image or a moving image acquired by interval shooting, so that they can be used as material for interval shooting.

Furthermore, in the above-described present embodiment, when a user operation (shutter button depression) for instructing to start still image recording or a user operation (REC button depression) for instructing to start moving image recording is detected at recording timing in the interval shooting mode, a still image or a moving image suitable for the interval shooting is generated from a still image or a moving image recorded by the user's instruction operation, which can be used as material for the interval shooting without a sense of incongruity.

Still further, in the above-described present embodiment, whether a still image or a moving image recorded by interval shooting and a still image or a moving image recorded by the user's instruction operation are separately outputted to be replayed or collectively outputted to be replayed can be selected. As a result of this configuration, when replaying images, the user can select whether to include manually captured images.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
    an imaging section;
    a first acquiring section which repeatedly acquires an image by driving the imaging section at preset timing;

a second acquiring section which acquires an image by driving the imaging section by receiving an instruction at arbitrary timing, while maintaining acquisition processing by the first acquiring section;

a storing section which stores the image acquired by the first acquiring section and the image acquired by the second acquiring section;

a judging section which judges whether the arbitrary timing and the preset timing coincide with each other; and a controlling section which controls at least one of imaging by the imaging section and storing of the image in the storing section, based on a judgment result by the judging section.

2. The imaging apparatus according to claim 1, wherein the storing section manages images based on which of the first acquiring section and the second acquiring section the images have been acquired by.

3. The imaging apparatus according to claim 2, wherein the storing section stores the image acquired by the first acquiring section and the image acquired by the second acquiring section such that images are managed in a manner to be identifiable as to which acquiring section the images have been acquired by, when the judging section judges that the arbitrary timing and the preset timing do not to coincide with each other.

4. The imaging apparatus according to claim 2, wherein the controlling section controls the storing section to manage the image acquired by the second acquiring section as an image acquired by the first acquiring section, when the judging section judges that the arbitrary timing and the preset timing coincide with each other.

5. The imaging apparatus according to claim 2, wherein the controlling section controls the storing section to manage the image acquired by the second acquiring section as an image acquired by the second acquiring section, when the judging section judges that the arbitrary timing and the preset timing coincide with each other.

6. The imaging apparatus according to claim 4, wherein the control section (i) controls the imaging section such that the first acquiring section acquires an image under a condition for acquisition at the preset timing and the second acquiring section acquires an image under a condition for acquisition at the arbitrary timing, (ii) generates an image satisfying the condition for acquisition at the preset timing from the image acquired by the second acquiring section, when the judging section judges that the arbitrary timing and the preset timing coincide with each other, and (iii) controls the storing section to manage the generated image as an image acquired by the first acquiring section.

7. The imaging apparatus according to claim 6, wherein the first acquiring section and the second acquiring section acquire a still image or a moving image as the image, and wherein the controlling section (i) controls the imaging section such that the second acquiring section acquires a moving image satisfying the condition for acquisition at the preset timing when the first acquiring section acquires a moving image, and (ii) generates a still image satisfying the condition for acquisition at the preset timing from the image acquired by the second acquiring section.

8. The imaging apparatus according to claim 1, wherein the storing section stores acquired images in relation to information indicating whether the images have been acquired by the first acquiring section or acquired by the second acquiring section.

9. The imaging apparatus according to claim 1, further comprising:

a playback output section which outputs and replays images stored in the storing section such that the image acquired by the first acquiring section and the image acquired by the second acquiring section are separately outputted and replayed.

10. The imaging apparatus according to claim 1, further comprising:

a playback output section which outputs and replays images stored in the storing section such that the image acquired by the first acquiring section and the image acquired by the second acquiring section are collectively outputted and replayed.

11. An image controlling method for an imaging apparatus including an imaging section, comprising:

a first acquiring step of repeatedly acquiring an image by driving the imaging section at preset timing;

a second acquiring step of acquiring an image by driving the imaging section by receiving an instruction at arbitrary timing, while maintaining acquisition processing in the first acquiring step;

a storing step of storing the image acquired in the first acquiring step and the image acquired in the second acquiring step;

a judging step of judging whether the arbitrary timing and the preset timing coincide with each other; and a controlling step of controlling at least one of imaging by the imaging section and storing of the image, based on a judgment result in the judging step.

12. A non-transitory computer-readable storage medium having stored thereon a program that is executable by a computer in an imaging apparatus including an imaging section, the program being executable by the computer to perform functions comprising:

first acquisition processing for repeatedly acquiring an image by driving the imaging section at preset timing;

second acquisition processing for acquiring an image by driving the imaging section by receiving an instruction at arbitrary timing, while maintaining the first acquisition processing;

storing processing for storing the image acquired in the first acquisition processing and the image acquired in the second acquisition processing;

judgment processing for judging whether the arbitrary timing and the preset timing coincide with each other; and control processing for controlling at least one of imaging by the imaging section and the storing processing, based on a judgment result in the judgment processing.

* * * * *